US008508174B2

(12) United States Patent
Haas et al.

(10) Patent No.: US 8,508,174 B2
(45) Date of Patent: Aug. 13, 2013

(54) ELECTRONICALLY COMMUTATED MOTOR

(75) Inventors: Benjamin Haas, St. Georgen (DE);
Frank Heller, Königsfeld-Burgberg (DE)

(73) Assignee: EBM-PAPST St. Georgen GmbH & Co. KG, St. Georgen (DE)

( * ) Notice: Subject to any disclaimer, the term of this patent is extended or adjusted under 35 U.S.C. 154(b) by 553 days.

(21) Appl. No.: 12/417,729

(22) Filed: Apr. 3, 2009

(65) Prior Publication Data
US 2009/0251084 A1    Oct. 8, 2009

(30) Foreign Application Priority Data

Apr. 5, 2008    (DE) .................... 10 2008 018 447

(51) Int. Cl.
*G05B 11/28*    (2006.01)
(52) U.S. Cl.
USPC ...................... 318/599; 318/400.04
(58) Field of Classification Search
USPC ............... 318/811, 599, 432, 434, 400.04
See application file for complete search history.

(56) References Cited

U.S. PATENT DOCUMENTS

| | | | | |
|---|---|---|---|---|
| 5,751,128 A * | 5/1998 | Chalupa et al. | ......... | 318/400.05 |
| 5,986,419 A * | 11/1999 | Archer et al. | ............ | 318/400.02 |
| 6,737,820 B2 * | 5/2004 | Witzig | ..................... | 318/400.41 |
| 6,825,627 B2 * | 11/2004 | Berroth et al. | ........... | 318/400.13 |
| 6,906,486 B2 * | 6/2005 | Berroth et al. | ........... | 318/400.29 |
| 7,825,558 B2 * | 11/2010 | Jungmayr et al. | ........... | 310/90.5 |

\* cited by examiner

*Primary Examiner* — Rina Duda
(74) *Attorney, Agent, or Firm* — Milton Oliver, Esq.; Oliver Intellectual Property LLC (57) ABSTRACT

An electronically commutated motor (ECM 20) has a rotor (28) and a stator, associated with which is a winding arrangement (26) to which electrical current (i1) is applied to drive the motor (20), a computer (36), and a PWM generator (84) associated therewith. The motor (20) is designed for operation in a parameter range that encompasses at least one variable parameter, e.g. operating voltage or ambient temperature, that can have different values. The computer (36) is configured to operate by carrying out these steps: After the motor (20) is switched on and before normal startup begins, during an initial time phase (T1), current (i1) delivered to the stator winding arrangement (26) is switched off and on using a pulse duty factor (pwm) derived from said variable parameter, in order to produce startup of the motor (20); subsequent to phase (T1), when the rotor (28) is rotating, normal startup is performed.

12 Claims, 11 Drawing Sheets

ELECTRONICALLY COMMUTATED MOTOR

CROSS-REFERENCE

This application claims priority from our German application DE 10 2008 018 447.0, filed 5 Apr. 2008, the entire content of which is hereby incorporated by reference. This application also refers to our recently-filed U.S. Ser. No. 12/361,551.

FIELD OF THE INVENTION

The present invention relates to an electronically commutated electric motor and, more particularly, to one electronically controlled using a Pulse Width Modulation (PWM) signal.

BACKGROUND

Such motors usually have a rotor excited by a permanent magnet, and a stator having a stator winding, to which winding energy is delivered during operation in order to drive the rotor. The rotor can also be externally excited, i.e. by means of a solenoid.

Depending on its design, a motor of this kind can have a suitable number N of phases, e.g. N=1, 3, >3; and it can have a suitable number of strands, e.g. a single-phase motor having one or two strands, a three-phase motor having three or six strands, etc. The motor can have one or more rotor position sensors to sense the rotor position, or it can operate partly or entirely according to the so-called "sensorless" principle.

If a motor of this kind is designed for operation over a wide voltage range, e.g. from 20 to 80 V (also referred to as a "wide voltage range motor"), it is then no longer possible to design the winding so that at the operating rotation speed, the voltage induced by the rotor in the stator winding corresponds approximately to the motor's operating voltage. This conventional design would produces a current limiting effect that is inherent in the motor, but in addition to an approximately constant rotation speed, this also requires an approximately constant operating voltage, which cannot exist with a wide voltage range motor.

In such a motor, the induced voltage is therefore often well below the operating voltage; this is referred to in technical jargon as a "sharp winding," i.e. such a winding has a small number of windings made of thick wire, and an electronic current limiter must therefore be provided in order to limit the motor current that flows into this "sharp winding." This applies in particular to startup, when the induced voltage has a value of zero, and a low-impedance winding arrangement can therefore very quickly cause high motor currents if the latter are not limited in an appropriate fashion (i.e., above all, very rapidly). The same applies to a motor of this kind that is running at a high operating voltage and stalls.

SUMMARY OF THE INVENTION

It is therefore an object of the invention to make available a novel electronically commutated motor which can adapt to differing operating voltage or temperature conditions or parameters.

This object is achieved by deriving, from the current parameter value, a pulse duty factor (pwm) which is then used by a digital controller to switch on and off the current applied to the stator winding arrangement during an initial time phase (T1) and, after the rotor is turning faster than a predetermined speed, initiating a "normal" motor startup process.

If the motor is intended for operation over a wide voltage range, for example 20V to 80 V, it must then be designed so that it does not receive too high a starting current at a high operating voltage (i.e., for example, 80 V); and conversely, it must be designed so that it can start sufficiently quickly and reliably even at a low operating voltage (i.e., for example, 20 V).

After the current is switched on in such a motor, a determination is therefore made of the instantaneous magnitude of at least one variable parameter that is to be considered in the context of starting, i.e. for example the instantaneous magnitude of the operating voltage.

This parameter is digitized using an A/D (analog-to-digital) converter, so that a digital value for it is obtained. For an 8-bit A/D converter, this value will be in the range from 0 to 255 digits; the allocation between the analog operating voltage and the digital value can be selected appropriately, i.e. also in nonlinear fashion if applicable. Proceeding from this digital value, a PWM value for controlling the motor current is ascertained using predetermined rules, and with that PWM value the motor current is controlled, during a predetermined first time span after startup, in regions that lie outside the commutation operations. It is thereby possible, in a context of high operating voltages, to keep the motor current below a predetermined maximum value at startup or if the motor stalls; and conversely, at low operating voltages, the motor current can be "raised" by using a high PWM value there.

Figure 6:
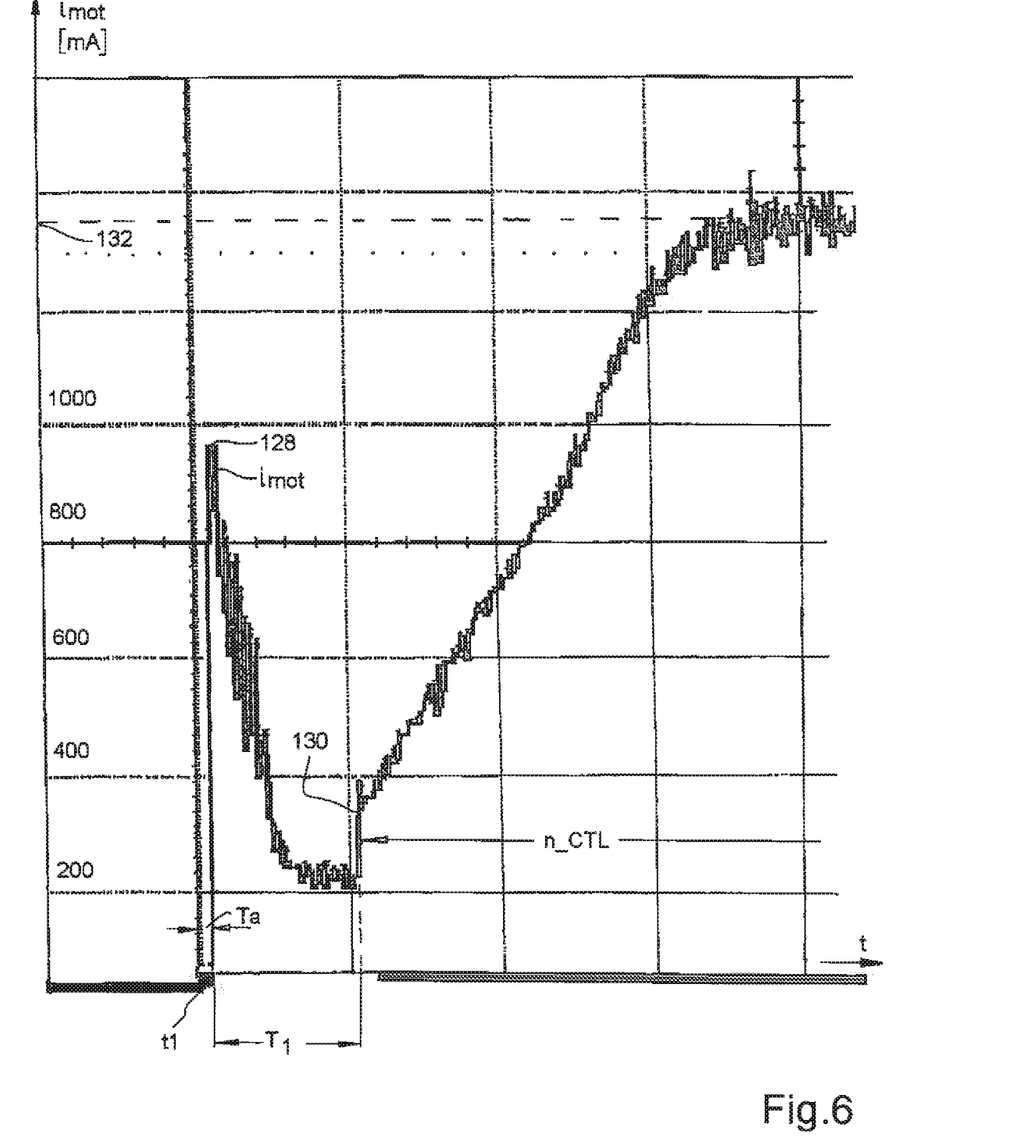
FIG. 6 is an oscillogram of the current profile upon startup of such a motor.

The motor customer may also require that the startup current be only of a magnitude such that the current source provided by the customer, e.g. the local battery of a telephone center, cannot be overloaded. This requirement can also be met by the invention, by modifying the predetermined rules for ascertaining the PWM value in such a way that the current that flows during startup is, for example, lower than the operating current (or running current) needed by the motor at full rotation speed. An example of this is shown in FIG. 6.

For operation in the Arctic or Antarctic, motors having ball bearings have the problem that the lubricating grease becomes so hard that the cold motor often can be started only with a greatly elevated starting current; and, in the case of a wide voltage range motor that is intended for such temperature extremes, this requirement must then be met within the entire permissible voltage range, in order to guarantee a reliable start in the context of all the variable operating parameters (variable operating voltage, variable temperature, etc.).

A description is given below, as an exemplifying embodiment, of one such motor that is excited by a permanent magnet and is commutated by means of a so-called H bridge. Such single-phase, single-strand, two-pulse motors are known in terms of their basic structure, but not for operation in a context of highly variable parameters, e.g. for operation at an operating voltage that is variable over a broad range.

The terms two-pulse, three-pulse, etc. refer to the number of current pulses in the stator for each 360°-el. revolution of the rotor.

Be it noted, once again, in this context that the embodiments are merely examples, i.e. that the invention is in no way limited to these exemplifying embodiments.

Further details and advantageous refinements of the invention are evident from the exemplifying embodiments, in no way to be understood as a limitation of the invention, that are described below and depicted in the drawings.

BRIEF FIGURE DESCRIPTION

FIGS. 5a to 5c are oscillograms indicating, for different operating voltages, the currents that flow in a stalled motor;

DETAILED DESCRIPTION

Figure 1:
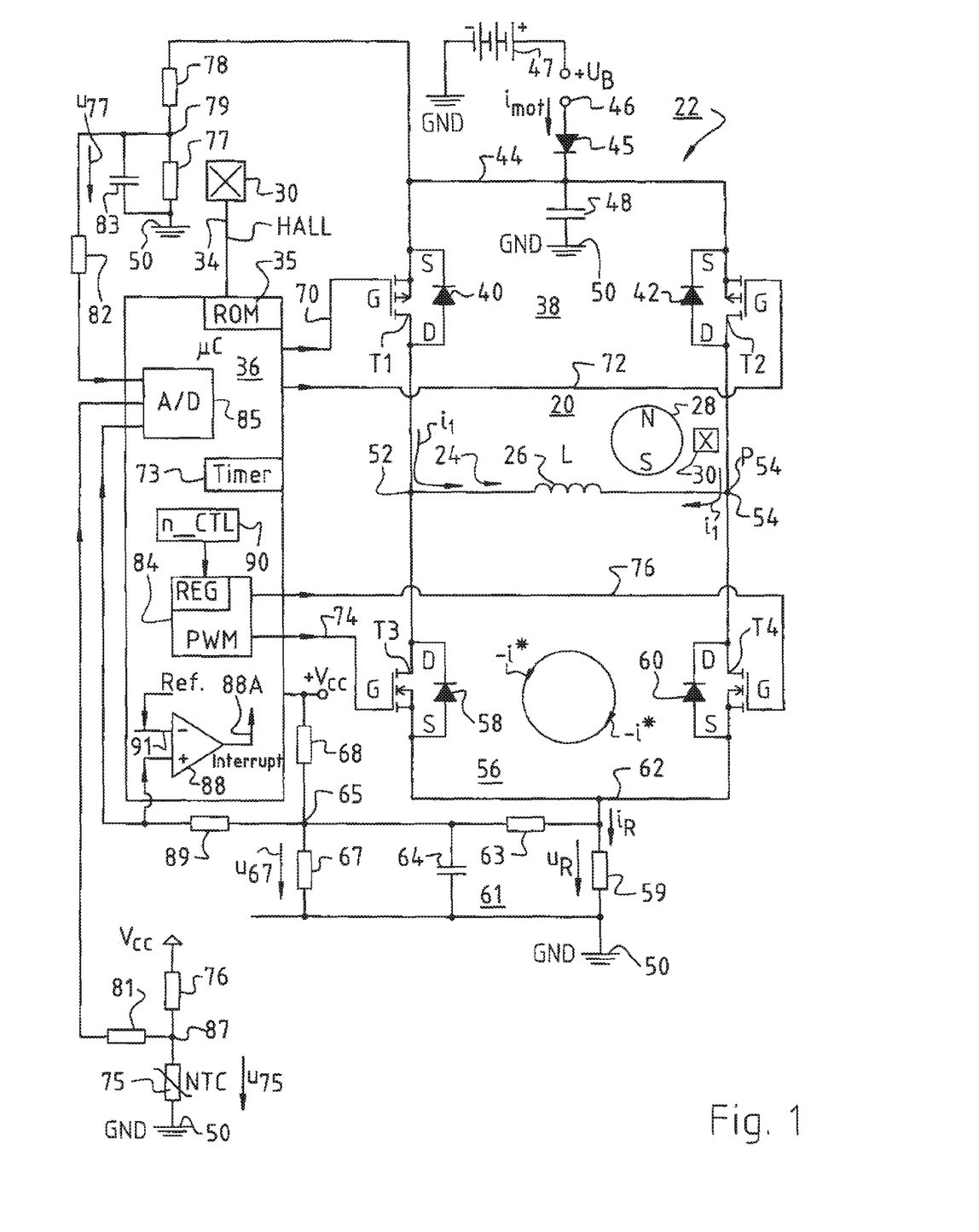
FIG. 1 is a circuit diagram of a preferred embodiment.

FIG. 1 shows the configuration of a two-pulse, single-strand, electronically commutated motor 20 whose single winding strand 26 is operated by means of an H bridge 22 whose H-shaped basic structure is highlighted using thicker lines in order to facilitate comprehension.

FIG. 1 is a highly schematic depiction of the basic structure of a two-pulse, single-strand, electronically commutated motor 20 whose single winding strand 26 is operated from an H bridge 22 whose H-shaped basic structure is highlighted with heavier lines, in order to facilitate comprehension.

In a transverse branch 24, which might also be referred to as the diagonal of H bridge 22, motor 20 has, in its stator, a winding strand 26 having an inductance L. Strand 26 interacts with a schematically depicted permanent-magnet rotor 28 that, depending on design, can take a wide variety of forms, for example internal rotor, external rotor, flat rotor, etc., and can have a variety of pole numbers, e.g. two poles (as shown), four, six, eight poles, etc.

A rotor position sensor 30, which is depicted twice in FIG. 1 and is usually a Hall sensor, is controlled by the magnetic field of rotor 28. The output signal "HALL" of sensor 30 is delivered via a lead 34 to a digital computer (in this case a microcontroller) 36, and supplies the latter with information about the instantaneous rotational position of rotor 28.

H bridge 22 has an upper bridge half 38 in which a p-channel MOSFET T1 is provided at the left and a p-channel MOSFET T2 at the right. MOSFET is an acronym for Metal Oxide Semiconductor Field Effect Transistor. A recovery diode 40 is connected in antiparallel with T1, and a recovery diode 42 in antiparallel with T2, the cathodes of which diodes are connected via a connecting lead 44 and a diode 45 to positive pole 46 of a voltage source UB whose voltage can fluctuate within wide limits, e.g. between 20 V and 80 V. Connecting lead 44 constitutes the positive part of a so-called "DC link" circuit whose negative part is constituted by ground 50.

Attached between ground 50 and the cathode of diode 45 is a capacitor 48 that is referred to as "link circuit" capacitor 48 and that serves in certain situations to briefly receive and store a recharge current from motor 20 and, immediately thereafter, to deliver the stored energy back to motor 20; this is explained in further detail below. The result is that during operation, there flows, between motor 20 and capacitor 48, an alternating current whose frequency depends on the rotation speed of motor 20 and whose level should be as low as possible, since this current results in heating of the capacitor 48 and thus shortens its service life and therefore also the service life of motor 20.

The anode of diode 40 is connected to a node 52, and that of diode 42 to a node 54. Winding strand 26 is arranged between nodes 52, 54, as shown.

H bridge 22 also has a lower bridge half 56 in which an n-channel MOSFET T3 is provided at the left and an n-channel MOSFET T4 at the right. A recovery diode 58 is connected in antiparallel with T3, and a recovery diode 60 in antiparallel with T4. The cathode of diode 58 is connected to node 52, and that of diode 60 to node 54. The anodes of diodes 58, 60 are connected via a connecting lead 62 and a low-impedance measuring resistor 59 to ground 50. A voltage uR occurs at measuring resistor 59 during operation, and that voltage is delivered, via a passive low-pass filter 61 constituted by a resistor 63 and a capacitor 64, to a first input of an A/D converter 85, for example in (mu)C 36, where it is converted into a digital value. If the A/D converter is implemented with 8 bits, this digital value is between 0 and 255 digits. In the exemplifying embodiment, the μC 36 used was the PIC 16F684 type, which comprises an A/D converter having eight input channels and a PWM generator 84 that has a frequency in the range of 15 to 30 kHz.

Because A/D converter 85 can only process only positive signals, but the voltage uR at measuring resistor 59 can also become negative during operation, that voltage uR is shifted electrically in a positive direction. For that purpose, the output of low-pass filter 61 is connected to a node 65 that is connected via a resistor 67 to ground 50 and via a resistor 68 to a regulated voltage+VCC, to which μC 36 is also connected.

EXAMPLE

In an experimental setup, the following values were used for the components:

| Motor 20 for fan drive | |
|---|---|
| Operating voltage | 48 V |
| Power consumption | 18 W |
| VCC | +5 V |
| Resistor 59 | 0.26 ohm |
| Resistors 63, 67 | 1 kilohm |
| Resistor 68 | 4 kilohm |
| Capacitor 64 | 1 nF. |

These values of course depend on a number of factors, and serve merely to explain an example. The components according to this example also serve for the implementation of an adaptive controller such as the one described in detail in our German Patent Application 10 2008 008 080.2 of 29 Jan. 2008 and our corresponding U.S. Ser. No. 12/361,551, filed 29 Jan. 2009. This controller serves to reduce the alternating current that flows into capacitor 48 during operation.

A voltage uR is obtained at measuring resistor 59 only when a current iR is flowing. If iR=0, a characteristic value is then obtained for u67; for the components in accordance with the example, this value is approximately 1 V, and for better identification this voltage is called uzero.

Uzero is measured when a loop current I* is flowing in lower bridge half 56. This current can flow either clockwise or counter-clockwise. In both cases, the two upper semiconductor switches T1 and T2 in FIG. 1 are nonconductive, and the two lower semiconductor switches T3 and T4 are conductive. As a result of the switchover, a loop current I* or −I*' briefly flows, during the commutation operation, through stator strand 26 and through the two lower semiconductor switches T3 and T4 or their diodes 58 or 60.

Because the two upper semiconductor switches T1 and T2 are nonconductive, in this case no current iR can flow through resistor 59 to or from motor 20, so that the voltage u67 at resistor 67, i.e. the input voltage of A/D converter 85, has the value Uzero, i.e. the value corresponding to the current iR=0. This value Uzero represents a reference voltage to which changes are referred. This enables the digitization of voltages uR that can be either positive or (in certain cases) negative, and that as a result of the arrangement with resistors 63, 67, 68 are shifted into a positive region in which digitization by A/D converter 85 is possible.

Semiconductor switches T1 to T4 are controlled via control connections 70, 72, 74, 76 by μC 36. The latter requires, for this purpose, information about the instantaneous rotor position, which information it obtains via the HALL signal and, if applicable, in other ways, e.g. by other kinds of sensor, by the so-called sensorless method, or in some other fashion. This is explained below.

Switchover of the current direction in strand 26 generally takes place shortly before the change in the HALL signal, by a so-called early commutation that is usually referred to in technical jargon as "ignition advance," or time-advanced commutation.

Operation

During operation, the two semiconductor switches T1 and T4 are, for example, made conductive first (depending on the rotational position of rotor 28), so that a current pulse i1 flows from terminal 46 through diode 45, semiconductor switch T1, node 52, winding strand 26, node 54, semiconductor switch T4, and measuring resistor 59 to ground 50. The amplitude of the current pulse i1 is determined by the pulse duty factor pwm, which is generated by PWM generator 84 and is delivered in this case to semiconductor switch T4. (The upper transistors T1, T2 are alternately switched completely on or completely off.)

The current pulse i1 is followed by a commutation operation, during which semiconductor switches T3 and T4 are continuously switched on by PWM generator 84; and at the beginning of that operation, external energy delivery to motor 20 is interrupted by making (in this example) T1 nonconductive.

When the current i1 is no longer flowing in winding strand 26 at the end of the commutation operation, T4 is also made nonconductive and semiconductor switches T2 and T3 are made conductive, so that a current pulse i1' now flows from terminal 46 through diode 45, semiconductor switch T2, node 54, strand 26, node 52, semiconductor switch T3, and measuring resistor 59 to ground 50.

Semiconductor switch T4 thus becomes blocked subsequent to commutation, ideally exactly when the loop current i* has just reached a value of zero, and semiconductor switch T2 is switched on so that a current pulse i1' now flows; the amplitude of the pulse is likewise controlled by a PWM signal from PWM generator 84, which signal is now delivered to semiconductor switch T3.

Simultaneously therewith, the analog voltage u67 is measured by A/D converter 85 as a digital value, thereby indirectly sensing the level of the voltage at measuring resistor 59.

When motor 20 is being optimally controlled, the voltage u67 likewise has the reference value Uzero when measured directly after commutation, i.e. in this case commutation is working ideally and does not need to be modified. Motor 20 is operating with very good efficiency, and the current to link circuit capacitor 48 becomes very low, so that the capacitor does not heat up and its service life is long.

If, however, commutation is not yet (or no longer) adjusted optimally, for example because the voltage UB has changed, then the voltage uR becomes briefly negative during commutation and the voltage u67 accordingly becomes less than Uzero. It is possible in this fashion to continuously optimize motor 20. This is of course particularly important when motor 20 is being operated on operating voltages that lie within a wide range of voltages.

The following pattern therefore results:

T1, T4 conductive; T2, T3 nonconductive→current flows through winding strand 26 in one direction (current pulse i1).

T3, T4 conductive; T1, T2 nonconductive→current I* loops in lower part 56 of H bridge 22.

T2, T3 conductive, T1, T4 nonconductive→current flows through winding strand 26 in the other direction (current pulse i1').

T3, T4 conductive, T1, T2 nonconductive→current−I* loops in lower part 56 of H bridge 22.

To sense the voltage at link circuit 44, the latter is connected to resistor 78 of a voltage divider 78, 77 which serves to reduce the voltage at link circuit 44 to a value in the range from 0 to +4 V that can be processed by A/D converter 85. A capacitor 83 is connected in parallel with resistor 77. Together they form a low-pass filter that filters out high-frequency interference. Resistor 77 is connected at the bottom to ground 50. Tapping point 79 of voltage divider 77, 78 is connected via a resistor 82 to a second input of A/D converter 85. The voltage at this input is converted, during operation, into a digital value that is between 0 and 255 digits and represents an indication of the voltage UB.

To measure the temperature, a voltage divider made up of a fixed resistor 76 and an NTC (Negative Temperature Coefficient) resistor 75 is connected to the regulated voltage VCC (+5 V), the latter resistor being connected to ground 50. Tapping point 87 of this voltage divider is connected via a resistor 81 to a third input of A/D converter 85. The potential at tapping point 87 is thereby converted into a digital value that is, for example, between 0 and 255 digits and that represents an indication of the temperature of motor 20. This digital value is used to raise the starting current of motor 20 at very low temperatures, so that reliable startup is possible. (Some slightly over-dimensioned motors do not require these features.)

Also present in μC 36 is a ROM (Read Only Memory) 35 having a program for controlling and regulating motor 20, also a rotation speed controller 90 (n_CTL) that controls the rotation speed of motor 20 after startup, a timer 73, and a comparator 88. The interaction of these parts is described below.

Figure 2:
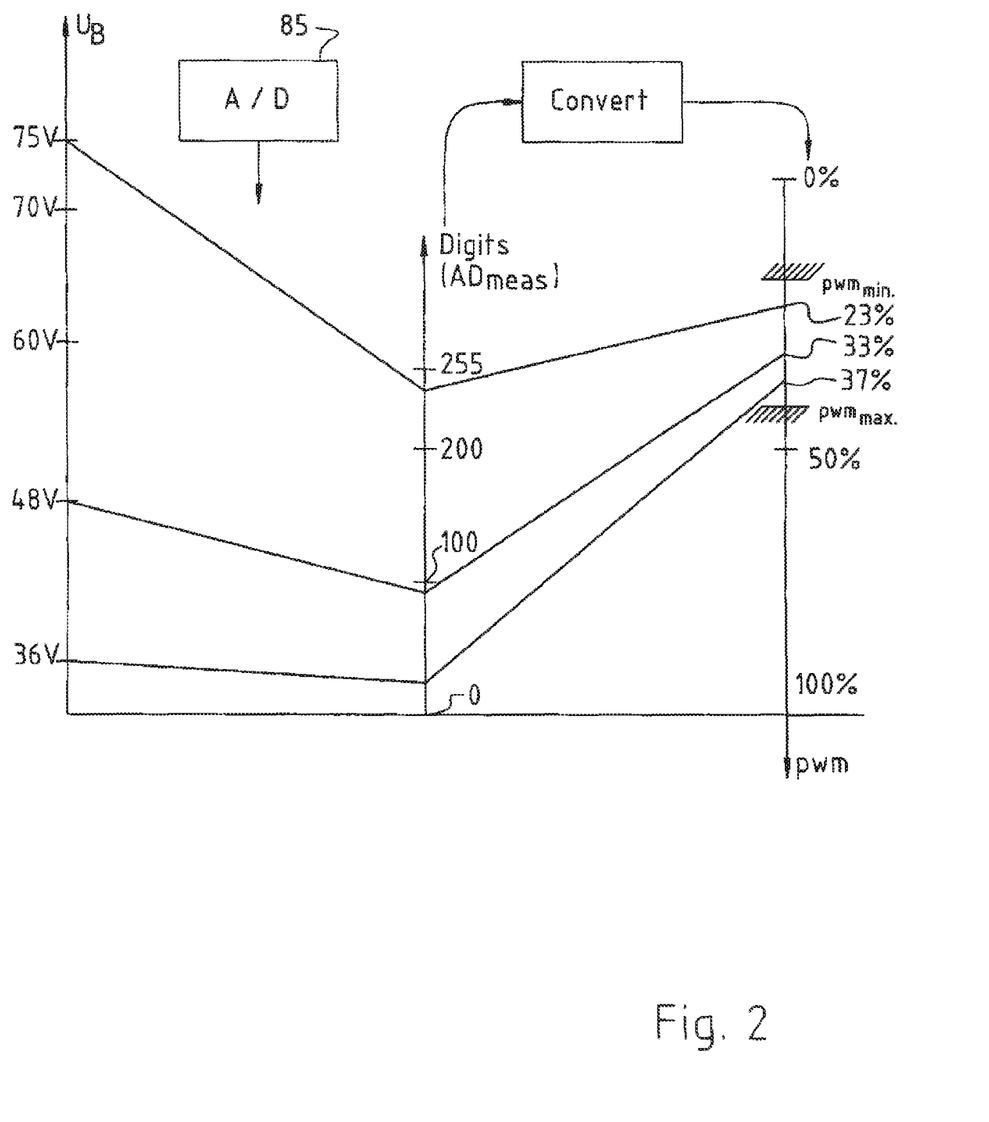
FIG. 2 schematically shows calculation of the pulse duty factor (pwm) for the starting current.

FIG. 2 serves for explanation. Shown at the left is the range of operating voltages UB at which motor 20 can function. In this example, it extends from 36 V to 75 V, i.e. a 1:2 voltage ratio. Because the applied voltage UB, even at 36 V, must still be greater than the voltage induced by rotor 28 in strand 26 during operation, strand 26 has only a small number of windings made of a relatively thick wire, and it consequently has a low internal impedance. In engineering jargon this is called a "sharp winding," which is particularly demanding in terms of control. (This type of motor characteristic is not otherwise usual in DC motors.)

UB is converted by A/D converter 85 into a digital number. As an example, UB=75 V might be converted into 240 digits when converter 85 is designed for 8 bits.

In μC 36, these 240 digits are converted, for example, into a pulse duty factor for motor current i1 or i1' of 23%, since in this case the operating voltage of 75 V at running speed is more than twice as high as the voltage induced in strand 26.

The current pulses i1 and i1' thus have a pulse duty factor of 23% in this case, during the starting phase of motor 20 when UB=75 V, and this pulse duty factor is kept constant during starting phase T1 (FIG. 6). The rotation speed increases in this context, as does the induced voltage, so that the amplitude of these current pulses decreases already in the starting phase.

At the beginning of a commutation operation, the two semiconductor switches T3 and T4 remain continuously switched on, since a loop current I* or −I* then briefly flows through them; this current converts the magnetic energy stored in winding strand 26 into mechanical energy to drive rotor 28. This enables a largely currentless switchover from current pulse i1 to current pulse i1' or vice versa. In addition, the so-called "ripple" current to capacitor 48 is thereby minimized.

The starting phase generally lasts long enough so that motor 20 can start up and reach an adequate rotation speed. A range of approximately 0.5 to 5 seconds is generally sufficient for this, depending on the size of motor 20. For fan motors, a value of approximately 1 second has proven favorable.

Rotation speed controller 90 is generally a PI (Proportional Integral) controller or PID (Proportional Integral Differential) controller, and during the starting phase it is deactivated, i.e. its P values and I values are kept at or close to zero, so that the rotation speed control operation does not begin until starting phase T1 has ended.

Comparator 88 (FIG. 1) serves for analog current limiting. It has an output 88A and a negative input 91 that is connected to an internal reference "Ref." in μC 36. With the μC 36 that is used, the internal reference "Ref." can be set via software to any of 16 graduated values, but of course any desired comparator and any reference voltage can be used. The magnitude of the "Ref." voltage defines the level of the current iR through resistor 59 at which current limiting is initiated.

The voltage u67 (at resistor 67), which is an indication of the current iR in resistor 59, is delivered to the positive input of comparator 88.

Figure 4:
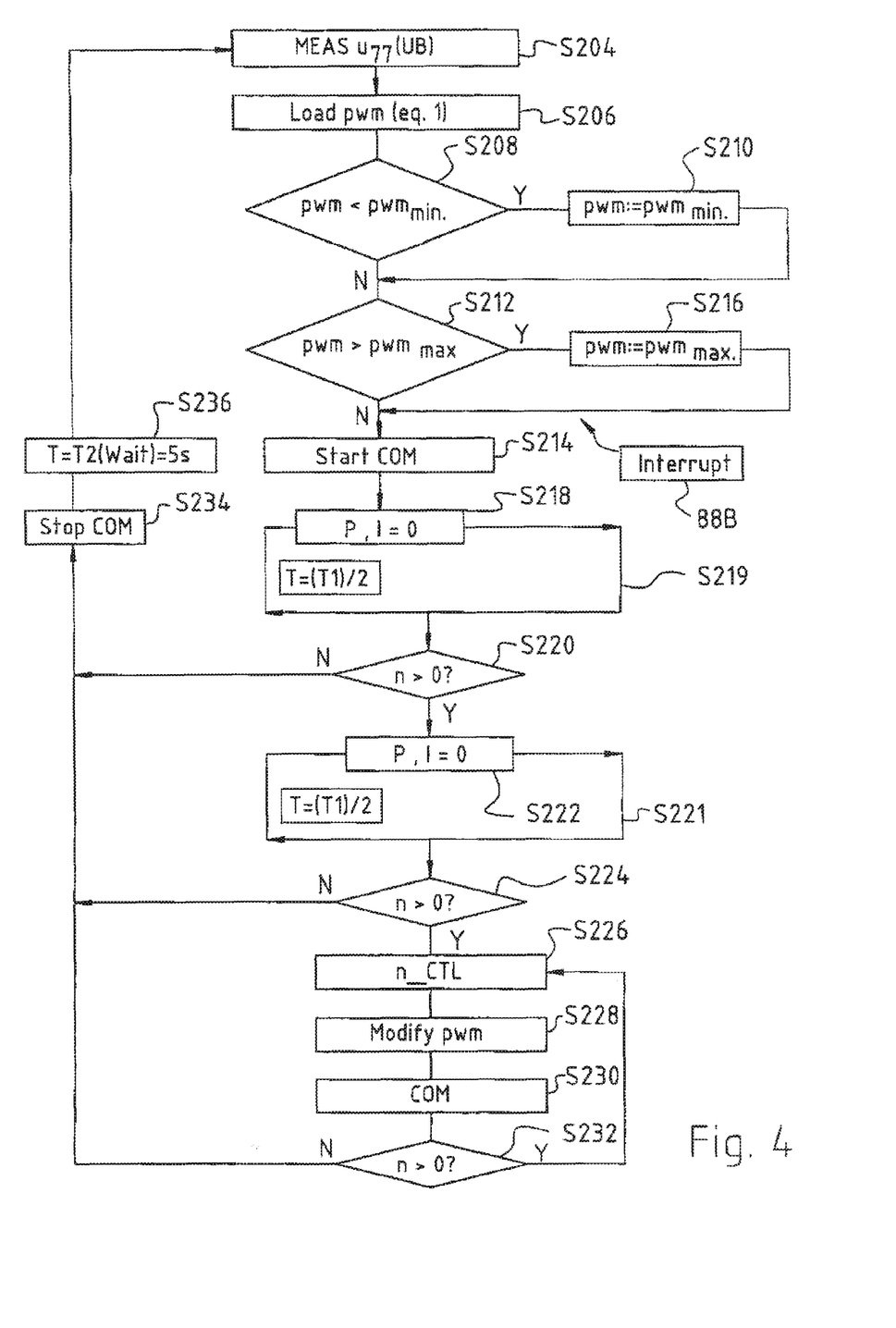
FIG. 4 is a first flow chart for the implementation of FIG. 3.

If the current iR, and thus the voltage u67, exceeds the value of the internal reference "Ref." at negative input 91, the change in the signal at output 88A then generates an interrupt "Intrpt" that is indicated in FIG. 4 at 88B and interrupts the main program depicted in FIG. 4; the result is to enable a quick reaction to an overcurrent, which is very advantageous in motors of this kind.

When interrupt 88B is executed, the upper power-stage transistors T1 and T2 are blocked and the lower power-stage transistors T3 and T4 are both made conductive, so that a loop current i* or −i* flows in them; this current decays quickly and drives rotor 28. The magnetic energy stored in the magnetic field of winding 26 is thereby converted into mechanical energy to drive rotor 28, so that the alternating current to link circuit capacitor 48 will have a low value. This prevents excessive heating of capacitor 48, and will extend its service life.

At the next cycle of PWM module 84, once again either the combination T1-T4 or the combination T2-T3 is switched on.

If too many interrupts (due to an excessively high iR) are generated in the time period between two changes in the HALL signal, all the transistors T1 to T4 are then shut off and the electronics are shifted into a so-called stall protection cycle in which current pulses are generated in strand 26, for example every five seconds, at the calculated pulse duty factor in strand 26. During this, it is checked whether the motor is starting, as described below.

Figure 3:
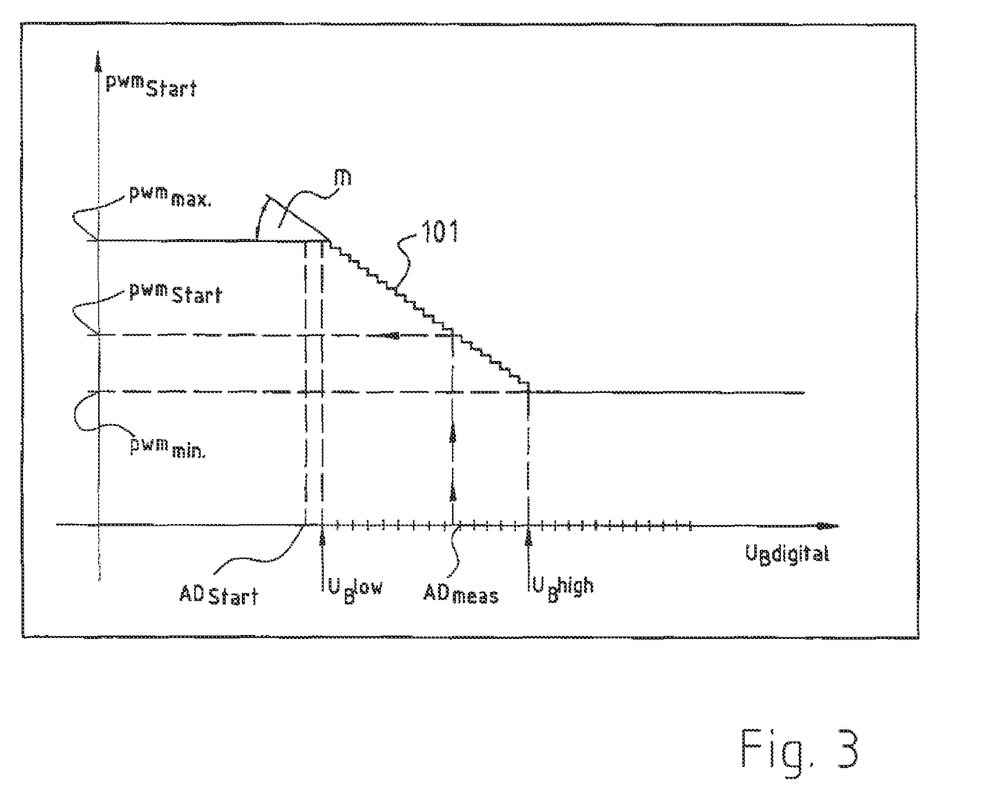
FIG. 3 is a schematic depiction indicating possible ways in which, by varying different values, the conversion, of the measured operating voltage UB into a pulse duty factor pwm that is appropriate for operation of the motor, can be optimized.

FIG. 3 serves to explain the conversion of a digitized value UBdigital, for the operating voltage UB, into a PWM (Pulse Width Modulation) value pwm suitable for the relevant motor type.

The engineer or technician who dimensions the relevant motor must of course design the winding so that a sufficiently high motor current can still flow even at the lowest operating voltage. He or she can furthermore stipulate various values, for example the maximum PWM value pwmmax for the starting current, for example 37% in FIG. 2; the minimum value pwmmin, which of course must be greater than zero and is, for example, 23% in FIG. 2; and lastly the slope m of a stepped curve 101 that graphically symbolizes the conversion of a calculated digital value AD into a value pwm with which the motor current imot can be switched on and off during the startup time period T1 in order to ensure reliable startup with a desired maximum current -- in other words: current limiting during startup using simple and economical means.

In reality, the measured value ADmeas is converted into a corresponding value pwm by μC 36, and FIG. 3 serves merely for didactic explanation of the operations that occur during operation upon startup of the relevant motor and that have to be considered for appropriate layout of the motor.

Usefully, a constant ADstart is also selected. This is a constant digital starting value for the supply voltage. When the supply voltage UB rises above this starting value, μC 36 begins to reduce the pulse duty factor pwm (for time span T1 of FIG. 6), in order to maintain an approximately constant torque at startup.

FIG. 4 is a schematic flowchart illustrating execution of the calculation operations as a function of the operating voltage UB, which in this case can fluctuate within broad limits, e.g. between 20 and 80 V.

At S204, the voltage u77 at resistor 77 is measured; this voltage is derived from the operating voltage UB and thus represents an indication of the operating voltage. This is accomplished using A/D converter 85 in μC 36, at whose output is obtained a value ADmeas in digits, i.e. for example a numerical value in digits between 0 and 255. This value is compared with the defined value ADstart, which is depicted in FIG. 3 and corresponds to a low operating voltage for this motor 20, so that at this voltage a high pulse duty factor pwmmax for the motor current is required.

If the measured operating voltage ADmeas is higher than ADstart, this means that the pulse duty factor pwm must be reduced as compared with pwmmax, since otherwise the motor current at startup would become too high. This is done in accordance with the formula below that is used in S206 of FIG. 4:

$$pwm = pwmmax - (ADmeas - ADstart) * m \quad (1)$$

in which pwm=Pulse duty factor that is calculated in FIG. 6 in time period Ta and is used in time span T1 to control the starting current imot;

pwmmax=Maximum pwm value for the starting current during time span T1;

ADstart=Selectable digital starting value for supply voltage UB, in digits;

ADmeas=Digital value for (variable) supply voltage UB, in digits;

m=Selectable factor.

EXAMPLE

If the following values are assumed for equation (1):
  m=0.14
  ADstart=10 digits
  ADmeas=95 digits
  pwmmax=42%,
the result is the following:

$$pwm=42\%-(95\ \text{digits}-10\ \text{digits})*0.14=30.1\% \qquad (2).$$

The motor current delivered from a (symbolically depicted) external energy source 47 is then (S214, S218, S219) switched on and off during starting time period T1 with a pulse duty factor of 30.1% and a frequency in the range of approximately 15 kHz to approximately 25 kHz.

S208 then checks whether the value pwm calculated in S206 is less than pwmmin. As FIG. 2 shows, this is not the case in this example, since here pwmmin=20%. If the result in S208 were Yes (Y), then in S210 the pwm value would be set to 20%, since a certain minimum value of the pulse duty factor is necessary for startup. (At pwm=0% the motor current would have a value of 0.)

S208 (or S210) is followed by S212, which checks whether the pwm ascertained in S206 is greater than pwmmax. If No, the program goes to S214. If Yes, the program goes to S216, which defines the value pwmmax for pwm in order to avoid an excessively high starting current. After S216 the program goes to S214, where the motor is started using the value ascertained for pwm.

At S219, during a time T that can be, for example, 0.5 second, motor 20 runs with a current that has this pulse duty factor, the values P and I for the PI or PID rotation speed controller 90 being continuously reset to zero in S218. (PWM generator 84 has a register REG into which the values for controlling PWM generator 84 are written.)

Once time T has elapsed, a step S220 checks whether rotor 28 is rotating, i.e. whether the rotation speed n is greater than zero. This can be done by checking the HALL signal. If No, the program goes to a step S234 in which the commutation of motor 20 is switched off because it is not rotating, i.e. is stalled. In the next step S236, motor 20 waits in the currentless state for a time T2 that can be, for example, 5 seconds, and then goes back to S204 in order to make a new starting attempt.

If the response in S220 is Yes, i.e. rotor 28 is rotating, the program then goes (in the case of a rotation speed controller 90) to step S222, in which (for a PI controller) the P values and I values of controller 90 are continuously reset to zero so that rotation speed controller 90, which ordinarily is continuously activated, has no influence on the rotation speed n of motor 20 during this phase. During this period, the process begun at S219 is continued at S221.

Once a further time T of, for example, 0.5 seconds has elapsed, another check is made, in this exemplifying embodiment at step S224, as to whether rotor 24 is rotating.

If the response in S224 is Yes, then rotor 28 is rotating, and a normal startup of motor 20 begins. If No, the program goes to S234.

The normal startup can be controlled by rotation speed controller 90 or by a current controller or even by an actuating drive, i.e. after phase T1 is complete, motor 20 is completely connected to the full voltage UB and accelerates to the rotation speed corresponding to that voltage UB. This has the advantage that the rotation speed of motor 20 can be controlled by modifying the voltage UB. This method is usual, for example, in telephone centers, where the rotation speed of a large number of fans can thereby be modified simultaneously, for example in order to increase cooling on a hot day.

In the case of the variant depicted in FIG. 4, after a Yes response in step S224 the program goes to step S226 "n_CTL" and then on to step S228 where the pulse duty factor pwm is modified, if applicable, by rotation speed controller n_CTL in order to achieve the desired rotation speed. Step S230 symbolizes commutation during the rotation of rotor 28, which takes place continuously, in a manner known to one of ordinary skill in the art of such motors.

S232 checks again whether rotor 28 is rotating. If No, the program returns to S234, S236, and S204 as already described, i.e. motor 20 is halted for 5 seconds each time and then attempts at intervals to restart.

If it is determined in step S232 that motor 20 is rotating, the program goes back to S226, and rotation at the target rotation speed continues.

It is possible in this manner to operate motor 20 reliably within a wide voltage range, for example within a range from 20 V to 80 V, without causing unreliable startup at 20 V or having too high a starting current at 80 V.

Figure 5A:
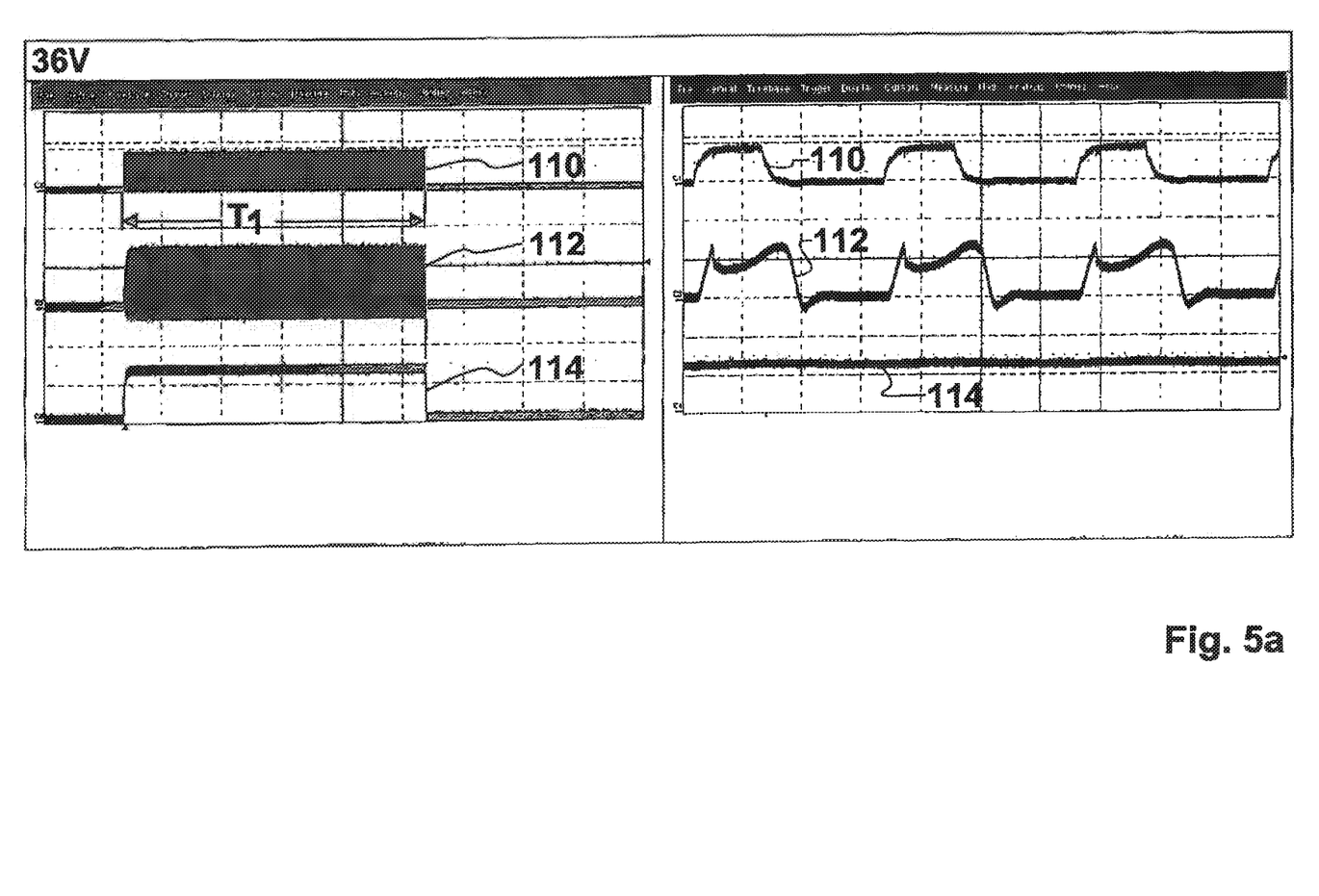

FIG. 5 shows a number of signals that can be measured at the motor when it is stalled. The graphs of FIG. 5a show the operation of a motor 20 at an undervoltage of 36 V.

Figure 5B:
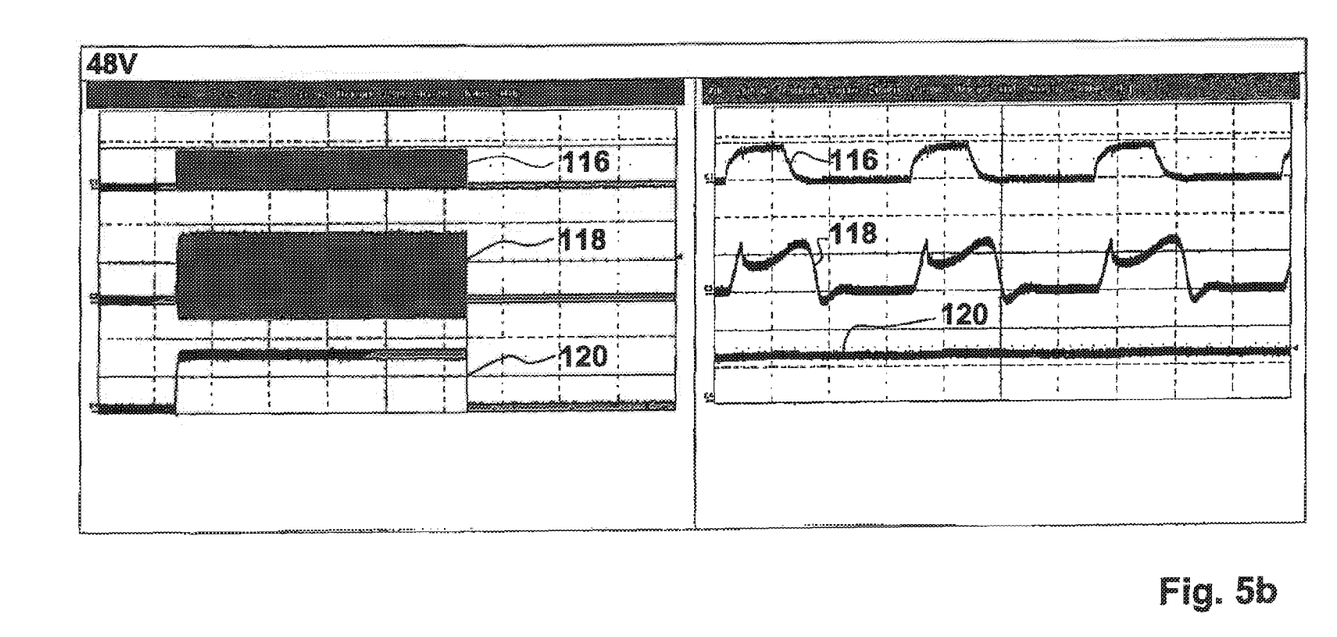
Figure 5C:
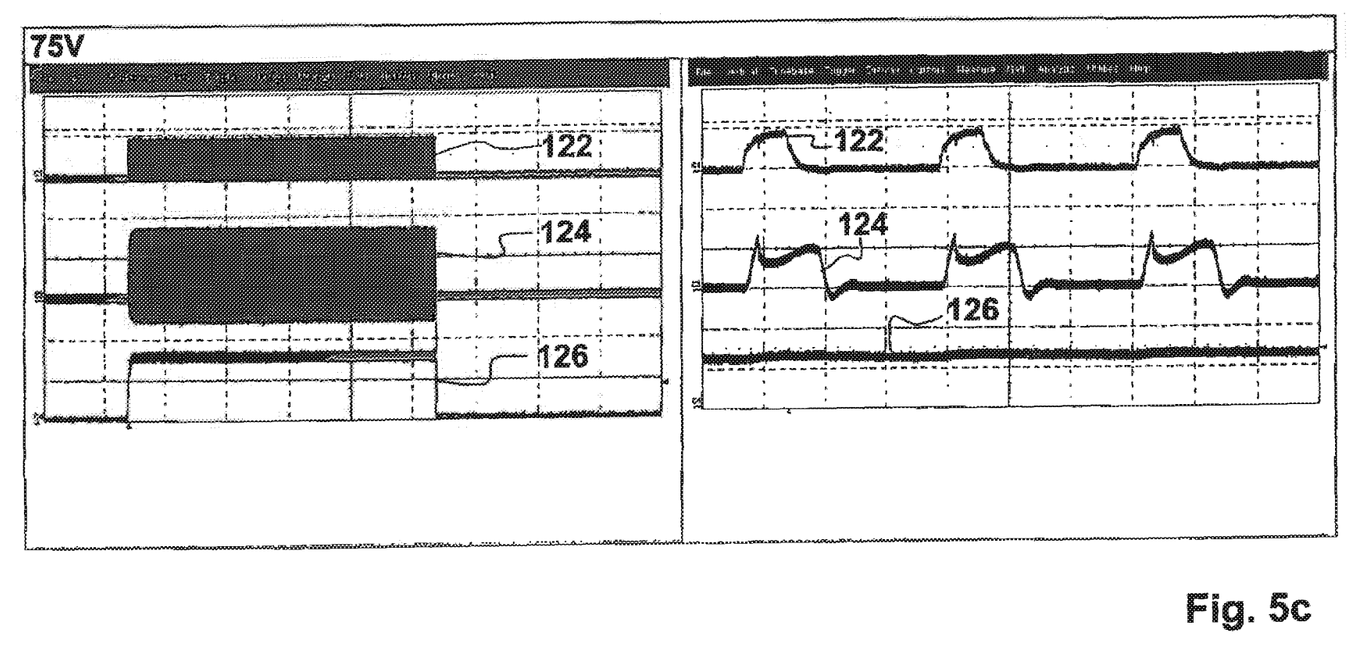

The graphs of FIG. 5b show the operation of that motor at its rated voltage of 48 V, and the graphs of FIG. 5c show its operation at an overvoltage of 75 V.

FIG. 5a shows at 110, for the undervoltage of 36 V, the pulse duty factor which, in this case, is equal to 37%. The signals during the time T1, which in this case is one second, are shown on the left; and on the right is a portion showing the signals with substantially greater time resolution.

The input current imot of motor 20 is shown at 112, and the current i1 in winding 26 at 114. A commutation is not depicted, since motor 20 cannot rotate in the stalled state.

FIG. 5b shows, at 116, the pulse duty factor for a rated voltage of 48 V. This pulse duty factor is lower than in FIG. 5a, and in this case is 33%. Curves 118 show the input current imot of motor 20, and curves 120 show the winding current i1, which does not differ from the value in FIG. 5a.

FIG. 5c shows at the top, at 122, the pulse duty factor for an overvoltage of 75 V; in this case it is only 23%. The input current imot is depicted at 124, and the winding current i1 at 126; the latter does not differ from the winding current 114 at 36 V or from the winding current 120 at 48 V.

The result is that despite differing operating voltages UB, a largely identical current imot is obtained at startup. Subsequent control (if provision is made for it) also results in identical behavior during operation, i.e. the user perceives no difference when connecting his or her motor to different DC voltages.

FIG. 6 shows a typical profile for the motor current imot at startup.

At time t1, motor 20 is switched on; this can also be the consequence of a previous stall situation. In the subsequent time segment Ta, steps S204 to S216 of FIG. 4 are carried out, motor 20 still being stationary.

When the pwm value for startup has been calculated after the completion of steps S212 or S216, steps S119 are repeatedly carried out during time span T1 in FIG. 4, with the result that motor 20 starts up with the calculated pwm and its rotation speed n increases.

At the beginning of time span Ta (FIG. 6), motor 20 is not yet rotating, i.e. the voltage (also called the "induced voltage") induced by permanent-magnet rotor 28 in winding strand 26 still has a value of 0 at this point.

For this reason, directly after switching on, i.e. at the beginning of time span T1, the motor current imot jumps to a high value 128, in this case e.g. to approximately 950 mA. Because motor 20 starts up quickly, the induced voltage rises quickly, so that imot drops, within 500 ms, to approximately 250 mA.

When time span T1 has ended, the program of FIG. 4 proceeds to the rotation speed control function n_CTL, i.e. to steps S226, S228, S230, S232. This causes, at the end of time span T1, a rise 130 in the current imot of approximately 160 mA. After this, the motor current imot rises within approximately 3 seconds to approximately 1350 mA, and the rotation speed (not depicted) of motor 20 rises to the desired value, e.g. to 5000 rpm.

It is evident, in this example, that the starting current 128 (950 mA) is equal to only about 70% of the running current 132 (1350 mA), and this is advantageous for many applications.

The starting procedure for such a motor 20 is thus made up of a measurement and calculation phase Ta (FIG. 6), in which the operating voltage UB is sensed and digitized and in which a value pwm for that digitized voltage is calculated for starting purposes. These operations take place during time Ta in FIG. 6.

This is followed by a starting phase (T1 in FIG. 6) in which the motor current imot is continuously switched on and off at the pulse duty factor pwm that has been calculated, with the result that motor 20 starts up and its rotation speed increases. In this context, the calculated results P, I of digital rotation speed controller 90 (which actually is active) are continuously suppressed (steps S218, S222 of FIG. 4).

At the end of time span T1, rotation speed control function n_CTL is activated so that rotation speed control begins, and the rotation speed n of motor 20 rises to a value that was set as a target value in the rotation speed controller. This is achieved by corresponding control of the value for the pulse duty factor pwm.

The transition from time span T1 (with constant pwm) to the n_CTL phase (with variable pwm) can be recognized in FIG. 6 by point 130, at which the current increases very quickly by about 160 mA.

A sophisticated concatenation of different sequences thus results in a motor that can be operated with largely identical properties in a voltage range from, for example, 20 V to 80 V, and that moreover can be started with a starting current (FIG. 6: 128) that is lower than the running current (FIG. 6: 132).

Figure 7:
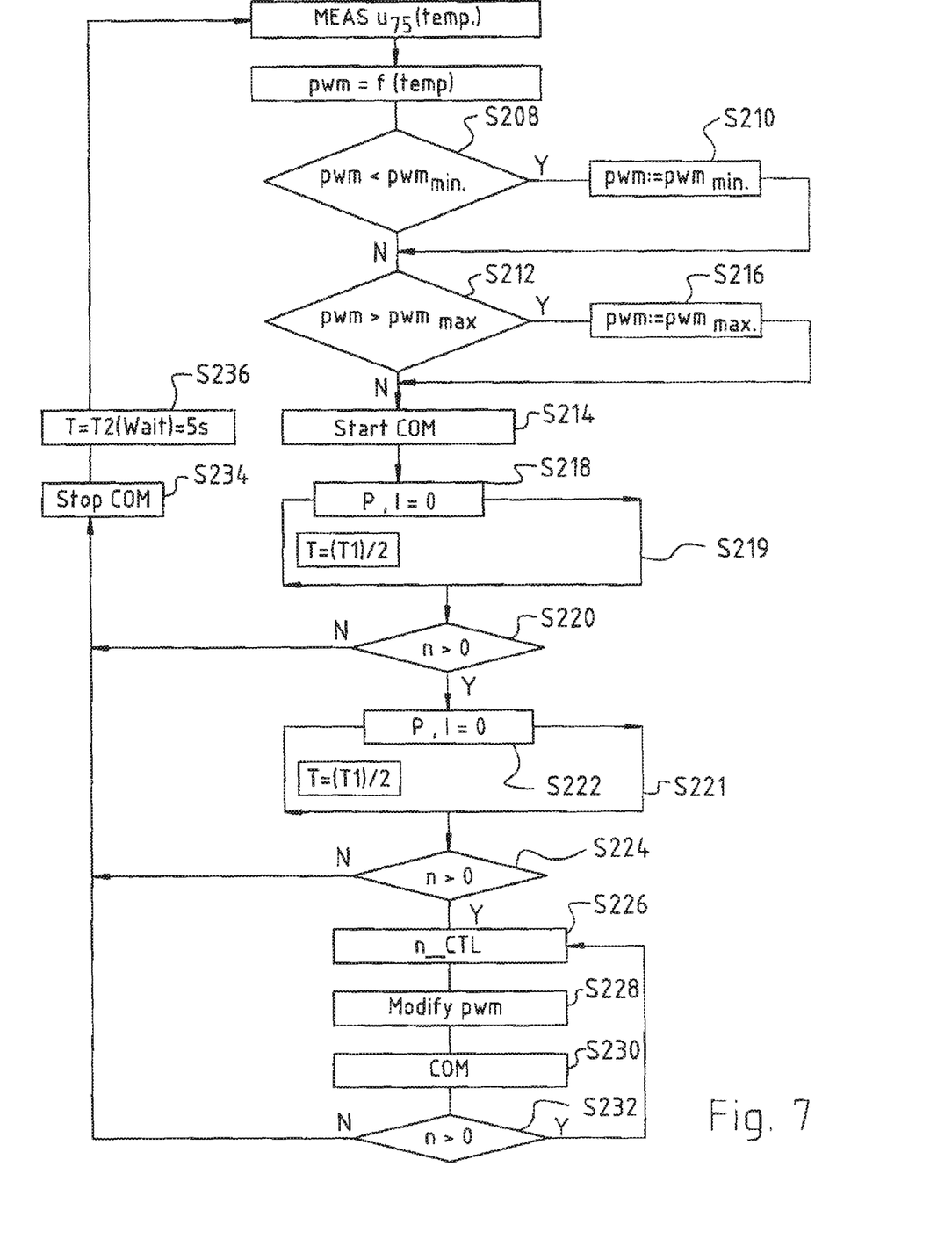
FIG. 7 is a second flow chart for the implementation of FIG. 3.

FIG. 7 shows a modification of FIG. 4. Identical steps are labeled with the same reference characters as therein, and are not described again.

In FIG. 7, the energy content of the starting current (128 in FIG. 6) is controlled by the temperature of NTC (Negative Temperature Coefficient) resistor 75 of FIG. 1. During operation, a voltage u75 occurs at resistor 75; that voltage is a variable parameter of the motor, since it is high at low temperatures and decreases with increasing temperature.

The voltage u75 is digitized in μC 36 by A/D converter 85, yielding a value ADmeas that in this case can be, for example, in the range between 0 and 255 digits. Based on this value, the pulse duty factor pwm is increased at low temperatures, so that this current increases with decreasing temperature.

This temperature-dependent value pwm is then subjected in S208, S210, S212, S214 to the checks described therein, and the rest of the procedure is as described in detail with reference to FIG. 4.

Figure 8:
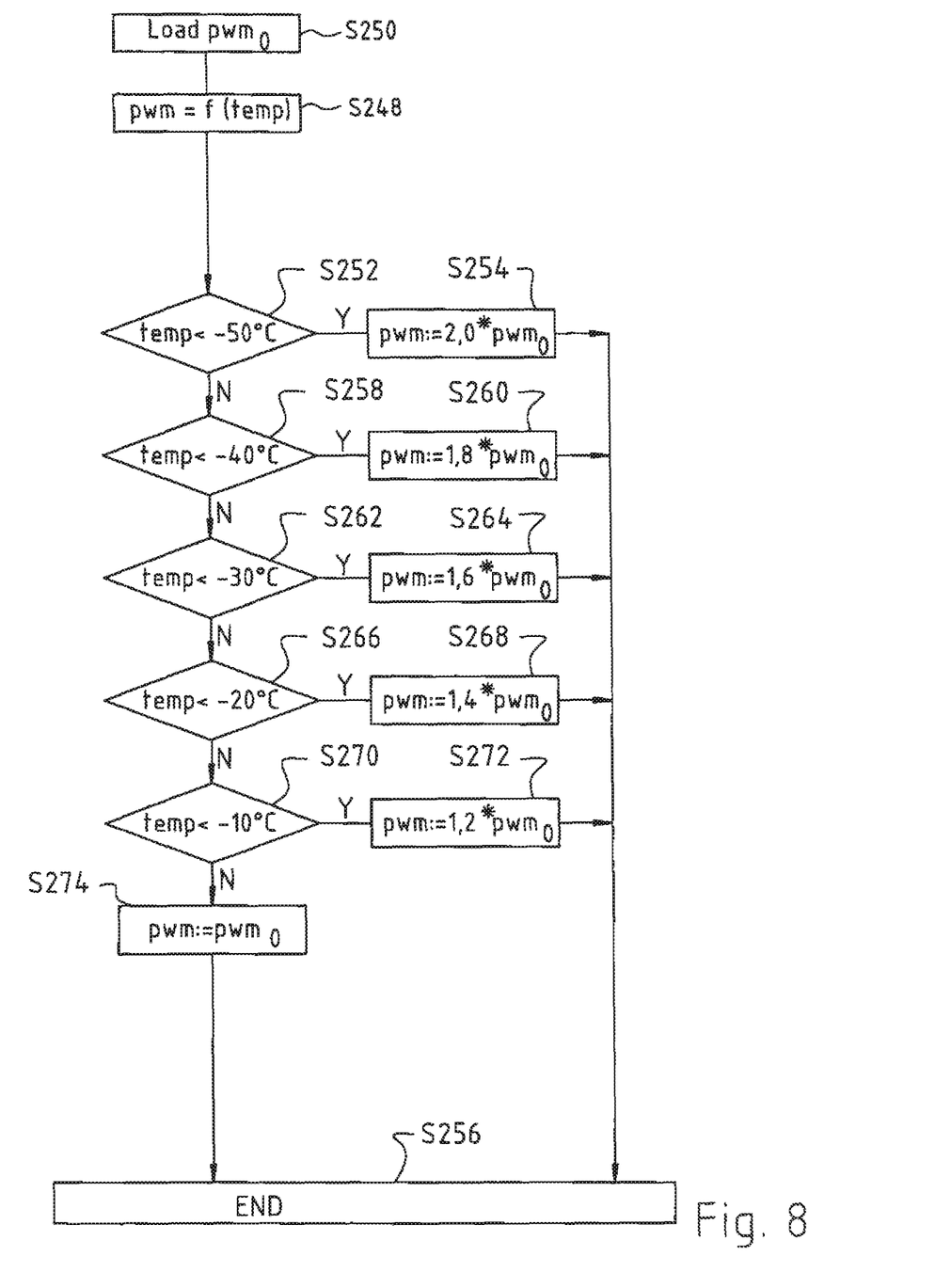
FIG. 8 shows a routine for increasing the pwm value as the ambient temperature drops.

FIG. 8 shows how the value pwm is ascertained as a function of temperature, by means of a routine S248 that is labeled pwm=f(temp).

Firstly, S250 loads a pulse duty factor pwm0 that, in the case of a motor 20 at the rated voltage 48 V, can be equal to e.g. 33%, as indicated by way of example in FIG. 2. This pulse duty factor pwm0 applies to this motor 20 at a normal operating temperature between −10° C. and +100° C.

Step S252 then checks whether the temperature is lower than −50° C. Such low temperatures occur on rail lines in Arctic regions, for example in Canada, and they require approximately twice as high a starting current, since the grease in the ball bearings becomes very hard at these low temperatures.

In S254 the value pwm0 loaded in S250 is therefore doubled, i.e. for example to 66%, in order to allow reliable startup. The program then goes to step S256, which is the end of this routine.

If it is found in S252 that the temperature is not below −50°, step S258 then checks whether the temperature is lower than −40° C. If so, the program goes to S260, where the value pwm0 is multiplied by 1.8 so that, in this example, the value pwm for startup is approximately 60%. The program then goes to S256.

If the response in S258 is No, the program goes to S262, which checks whether the temperature is lower than −30° C. If so, in S264 the value pwm0 is multiplied by 1.6, i.e. in this example pwm=33%×1.6=52.8%, and motor 20 is then started in region T1 (FIG. 6) using this value.

If the response in S262 is No, S266 then checks whether the temperature is lower than −20° C. If so, then in S268 pwm0 is multiplied by 1.4, i.e. (in this example)

$$pwm=33\%\times 1.4=46.2\%,$$

and this value is therefore used to start motor 20 when its temperature is between −20 and −30° C.

If the response in S266 is No, S270 then checks whether the temperature is below −10° C., and if so, the value $$pwm=1.2\times pwm0$$

is used in S272 for pwm; in this example, therefore, 33%× 1.2=39.6%, and motor 20 is started using this pulse duty factor at temperatures between −10° C. and −20° C.

If the response in S270 is No, S274 sets the condition $$pwm:=pwm0;$$

in other words, the motor is started in this instance using the pulse duty factor pwm0, which in this example is equal to 33% and is defined by experiment.

The multipliers 1.2, 1.4, 1.6, 1.8, and 2.0 must of course also be ascertained by experiment using the relevant motor, and represent at best approximate guideline values that are indicated only for didactic reasons.

If motor 20 does not start at the doubled pulse duty factor according to step S254, the factor 2.0 can optionally be further increased by way of additional program steps until the motor runs. In this context, the elevated starting current flows only during the short time span T1 in FIG. 6, so that the (cold) motor cannot be damaged by a briefly high current. During the subsequent normal startup, the current in motor 20 is controlled, for example, by rotation speed controller 90; the grease in the ball bearings is warmed up by the rotation of rotor 28, and normal conditions are soon established.

Figure 9:
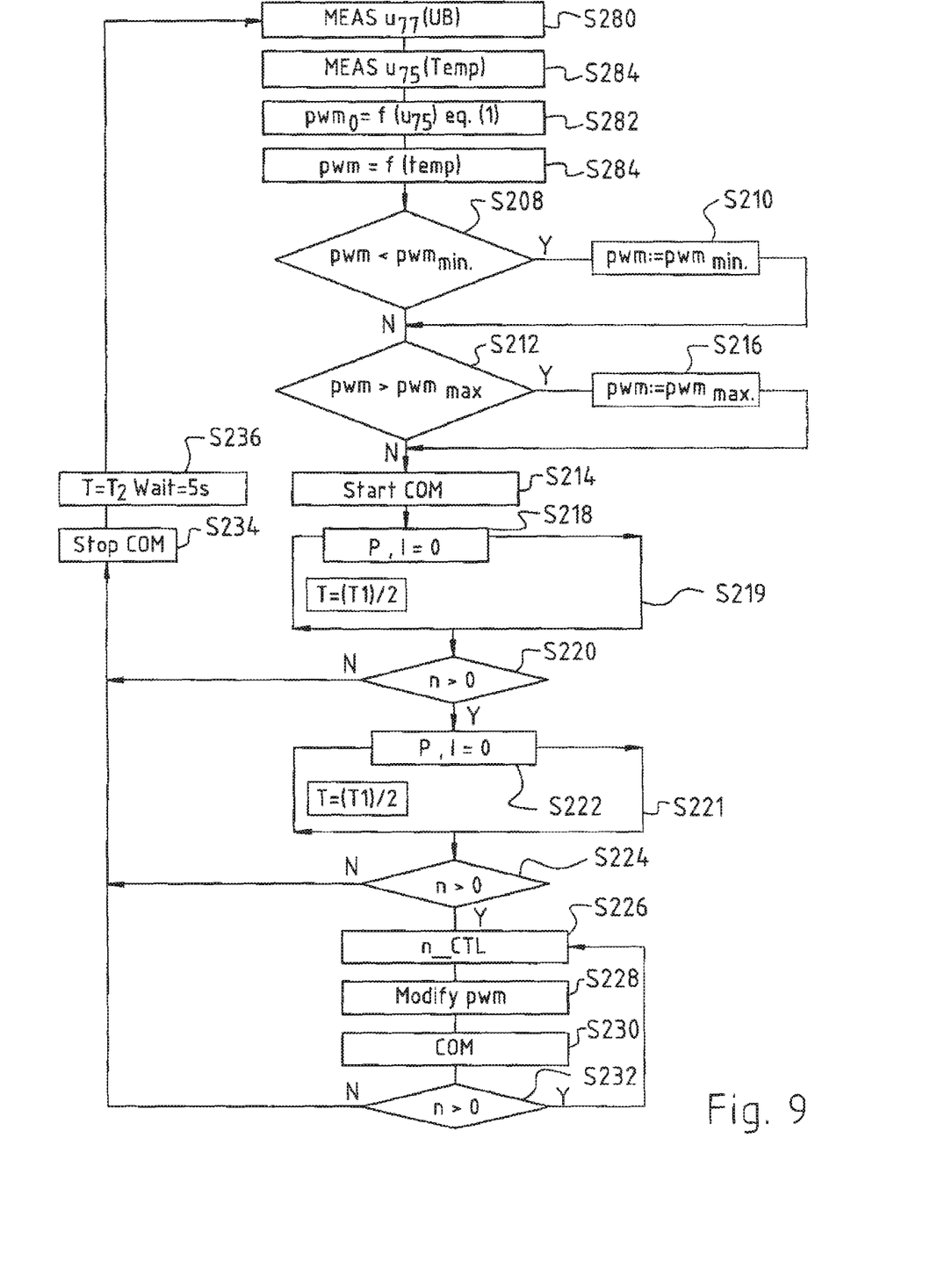
FIG. 9 is a third flow chart that serves for simultaneous implementation of a correction of the pwm value as a function of the instantaneous operating voltage UB and the instantaneous ambient temperature.

FIG. 9 is a flow chart that takes into account two variable parameters, namely the variable operating voltage UB (as in FIG. 4) and the variable temperature of motor 20 (as in FIG. 7).

The structure of the flow chart is very similar to that in FIGS. 4 and 7, so that here again only the portions that differ are described. In the interest of brevity, the reader is referred to the description of FIGS. 4 and 7 regarding identical or identically functioning components.

In FIG. 9, the operating voltage UB is sensed in S280. This is done in FIG. 1 by measuring the voltage u77 at resistor 77. This voltage is digitized, and is converted in step S282, using the formula according to equation (1), into a voltage-dependent pulse duty factor that is here labeled pwm0 and can be, for example, between 20 and 40% (cf. FIG. 2).

Additionally, in step S284, the temperature-dependent voltage u75 is measured and converted, using A/D converter 85, into a digital value.

The voltage-dependent pwm0 that has been ascertained is modified if applicable using the routine in FIG. 8; for example, if a pwm0 of 23% is ascertained at a UB=75 V for the temperature range −10° C. to +100° C., as depicted by way of example in FIG. 2, then in step S284 (which corresponds to the routine according to FIG. 8), this pulse duty factor (23%) is doubled to 46% at temperatures below −50° C. in order to produce a sufficiently high starting current 128 in time region T1 of FIG. 6.

Two or more variable parameters for optimum definition of the pulse duty factor pwm in time region T1 of FIG. 6 can thereby be ascertained in simple fashion.

At these temperatures, the time region T1 can also be automatically extended using corresponding program segments (not depicted) in order to enable a particularly reliable startup of motor 20.

What is thus obtained is a wide-voltage, wide-temperature motor that can adapt automatically to a large plurality of variable operating parameters and is thus usable in a particularly versatile manner.

Numerous variants and modifications are of course possible within the scope of the present invention.

What is claimed is:

1. An electronically commutated electric motor comprising
   a rotor (28);
   a stator, associated with which is a stator winding arrangement (26) to which electrical current (i1) from an external energy source (47) is applied, during operation, in order to drive the motor (20), the external energy source (47) applying a first voltage ($U_B$) to said winding arrangement (26);
   a digital computer (36) that is configured and adapted to control a normal startup process of the motor (20);
   a PWM generator (84) associated with the digital computer (36), the motor (20) being designed for operation in a parameter range that encompasses at least one variable parameter that can have different values upon startup of the motor (20), the at least one variable parameter being said first voltage,
   the digital computer (36) having associated with it an analog-to-digital converter (85) that is configured to output at least one digital value (ADmeas) which characterizes an instantaneous magnitude of said variable parameter; and the digital computer (36) being configured to carry out, during operation, the steps of:
   generating at least one digital value that characterizes the instantaneous magnitude of the variable parameter;
   after the motor (20) is switched on and before said normal startup process begins, during a first time phase (T1), switching on and off the current (i1) delivered to the stator winding arrangement (26) from the external energy source (47) using a pulse duty factor (pwm) derived from the at least one digital value, said pulse duty factor being a function of the first digital value, in order to produce startup of the motor (20), regardless of possibly unusual conditions;
   subsequent to the first time phase (T1), and while the rotor (28) is rotating, initiating a normal startup process of the motor (20).

2. The motor according to claim 1, which is configured to further carry out, during operation, the step of generating the at least one digital value before the beginning of the first time phase (T1) and deriving, from that at least one digital value (ADmeas), a pulse duty factor (pwm) employed during the first time phase (T1).

3. The electric motor according to claim 1, further comprising a rotation speed controller (90) that is configured to be deactivated during the first time phase (T1) and to regulate the rotation speed (n) of the motor (20), upon transition to a normal startup process of the motor, to a desired value, by controlling the pulse duty factor.

4. The electric motor according to claim 3, wherein the rotation speed controller (90) is implemented as a proportional-integral controller.

5. The electric motor according to claim 3, wherein
   the rotation speed controller (90) is so configured that it is deactivated during a startup phase of the motor (20).

6. The electric motor according to claim 1, wherein a minimum value (pwmmin) for the pulse duty factor is predetermined, below which value the pulse duty factor is not permitted to decline, regardless of the magnitude of the variable parameter.

7. The electric motor according to claim 6, wherein the minimum value (pwmmin) is adjustable.

8. The electric motor according to claim 1, wherein a maximum value (pwmmax) for the pulse duty factor is predetermined, above which value the pulse duty factor is not permitted to rise, regardless of the magnitude of the variable parameter.

9. The electric motor according to claim 8, wherein the maximum value is adjustable.

10. The electric motor according to claim 1, wherein a factor (m), which can be selected when the motor (20) is designed, is provided, for the purpose of converting the first digital value into a pulse duty factor.

11. The electric motor according to claim 1, wherein,
    during calculation of the pulse duty factor, a predetermined maximum pulse duty factor (pwmmax) has subtracted, from it, a value that is a function of the difference between the maximum pulse duty factor (pwmmax) and an instantaneously ascertained difference between a selectable starting value (ADstart) for the supply voltage and the actual value (ADmeas) for the supply voltage.

12. The electric motor according to claim 11, wherein the subtracted value is also a function of the selected factor (m).

* * * * *